United States Patent [19]

Güttinger et al.

[11] Patent Number: 4,647,786

[45] Date of Patent: Mar. 3, 1987

[54] PHOTOELECTRIC SMOKE DETECTOR AND ITS APPLICATION

[75] Inventors: Hannes Güttinger, Stäfa; Martin Labhart, Männedorf, both of Switzerland

[73] Assignee: Cerberus AG, Männedorf, Switzerland

[21] Appl. No.: 606,827

[22] PCT Filed: Oct. 10, 1983

[86] PCT No.: PCT/CH83/00112

§ 371 Date: Apr. 16, 1984

§ 102(e) Date: Apr. 16, 1984

[87] PCT Pub. No.: WO84/02790

PCT Pub. Date: Jul. 19, 1984

[30] Foreign Application Priority Data

Jan. 11, 1983 [CH] Switzerland .......................... 119/83

[51] Int. Cl.$^4$ .......................................... G01N 21/85

[52] U.S. Cl. .................................... 250/574; 250/564; 356/432

[58] Field of Search ............... 250/573, 574, 564, 565; 356/432

[56] References Cited

U.S. PATENT DOCUMENTS 4,206,454 6/1980 Schapiia ............................ 250/554

*Primary Examiner*—Gene Wan

*Attorney, Agent, or Firm*—Werner W. Kleeman

[57] ABSTRACT

In a photoelectric smoke detector, a radiation source is driven intermittently by a control circuit and the radiation influenced by smoke particles, for instance scattered radiation, is picked up by a radiation receiver. The signal of the radiation receiver is transmitted to a signal processing circuit which is transmitted to a signal processing circuit which is simultaneously regulated by the control circuit. The signal processing circuit comprises a phase sensitive circuit which reverses or inverts the received signal according to the phase of the signal of the control circuit and transmits the thus modified signal to an integrating circuit. The integrating circuit controls a display circuit by means of its integrated output signal. The display circuit can, for instance, output an alarm signal when the integrated signal, i.e. the smoke intensity, exceeds a prescribed threshold value or can display the smoke intensity. In this manner, even weak smoke signals can be surely and reliably detected even when they are fully masked by noise. Such a smoke detector can be advantageously employed as an especially sensitive and interference-resistant fire alarm.

19 Claims, 4 Drawing Figures

PHOTOELECTRIC SMOKE DETECTOR AND ITS APPLICATION

CROSS REFERENCE TO RELATED CASE

This application is related to the commonly assigned, copending U.S. application Ser. No. 06/606,828, filed Apr. 16, 1984, entitled "SCATTERED RADIATION SMOKE DETECTOR", and listing as the inventors HANNES GÜTTINGER and GUSTAV PFISTER.

BACKGROUND OF THE INVENTION

The present invention broadly relates to smoke detectors and, more specifically, pertains to a new and improved construction of a photoelectric smoke detector.

Generally speaking, the photoelectric smoke detector of the present invention relates to a photoelectric smoke detector having a source of radiation driven intermittently by a control circuit and a radiation receiver which is connected to an evaluation circuit which is able to transmit a smoke alarm signal when the radiation receiver receives radition that has been affected by smoke particles in synchronous operation with the radiation source.

In other words, the photoelectric smoke detector of the present invention comprises a radiation source, a control circuit for intermittently driving the radiation source and a radiation receiver. The radiation receiver is connected to an evaluation circuit capable of outputting an alternating smoke alarm signal having at least one phase when the radiation receiver receives radiation influenced by smoke particles in synchronization with operation of the radiation source.

That is, the photoelectric smoke detector of the present invention is of the type comprising a source of radiation for emitting radiation, a control circuit for generating an alternating signal exhibiting a phase and for intermittently driving the source of radiation in synchronism with the phase of the altnerating signal, a radiation receiver for receiving a portion of the radiation influenced by smoke particles and for generating an output signal indicative of the received portion and exhibiting a polarity as well as an evaluation circuit connected to the radiation receiver and to the control circuit for generating a smoke alarm signal when the radiation receiver receives the portion of the radiation influenced by smoke particles in synchronism with the radiation intermittently emitted by the source of radiation.

The present invention also relates to a fire alarm device for detecting smoke particles generated by a fire and comprising a photoelectric smoke detector of the inventive type.

The smoke detector can, for example, be structured as a scattered radiation detector in which the radiation scattered from smoke particles is evaluated, or as a radiation extinction detector which exploits the diminution of radiation or its absorption by smoke particles, or as a photo-acoustic smoke detector in which the smoke particles emit acoustic pulses upon absorbing radiation pulses and an acoustical-electrical converter transforms them into electrical pulses, such as is described in European Patent Application EP No. 14,251. The smoke detector can also serve as a smoke sensor in which the value of the emitted smoke alarm signal is an indication of the smoke intensity. It can also serve as a smoke alarm which gives warning of a prescribed intensity of smoke.

In such smoke detectors, such as for example the scattered radiation smoke detector described in PCT Application WO No. 80/01326, which are preferably employed as fire alarms, electromagnetic radiation is radiated into a measuring volume, for instance by means of a light-emitting diode (LED) and the radiation scattered from smoke particles in the measuring volume is received by a scattered radiation receiver disposed outside of the radiating zone of the radiation source. An evaluation circuit outputs a smoke alarm signal when the level of scattered radiation exceeds a prescribed threshold. Electromagnetic radiation is to be understood as including visible light, infrared radiation or ultraviolet radiation.

A key problem in the art is to assure that a smoke alarm signal only be initiated by radiation scattered from smoke particles and not by interference radiation penetrating into the measuring volume which could equally well be picked up by the radiation receiver and falsely indicate the presence of radiation-scattering smoke particles. This is particularly important in smoke detectors in which only a limited intensity of radiation is available in the measuring volume, for instance in smoke detectors in which the radiation is conducted to and fed back from the measuring volume by means of radiation conducting elements or fiber optics, as for example is described in German Patent Application No. 3,037,636.

In order to prevent interference radiation from giving false smoke alarm signals it is known, for example from European Patent No. 11,205 or European Patent No. 14,799, to operate the radiation source in very short pulses and to connect the radiation receiver to a coincidence circuit which only generates a smoke alarm signal when scattered radiation is received during the short radiation pulse periods but not during response to the occurrence of the interference radiation pulses in the intermediate intervals. The rare case in which an interference pulse is received during the short period of radiation pulse can be eliminated by a repetition circuit which only re-transmits a smoke signal when a plurality of coincidences occur in sequence.

As far as sufficiently intensive radiation pulses are available, fire alarms insensitive to interference can be obtained through the use of such evaluation circuits. Many radiation sources, however, can only deliver a limited maximum intensity without damage or premature aging and furthermore there is radiation damping in fiber optics transmission so that it is advantageous or necessary to provide longer active intervals of the radiation source in order to obtain sufficient scattered radiation capacity. The evaluation circuits mentioned then do not operate with sufficient intensity to interference, since on the one hand, the occurrence of interference pulses during the active intervals is much more probable, and since on the other hand, the signal-to-noise ratio in the radiation receiver can become so small that some noise pulses attain the signal level and give rise to a false alarm signal. Particularly weak concentrations of smoke, in which the signal lies below the noise level, could not be detected at all in this manner, i.e., the sensitivity of fire alarms having such evaluation circuits is limited.

SUMMARY OF THE INVENTION

Therefore, with the foregoing in mind, it is a primary object of the present invention to provide a new and improved construction of a photoelectric smoke detector which does not exhibit the aforementioned drawbacks and shortcomings of the prior art constructions.

Another and more specific object of the present invention is to avoid the above-mentioned disadvantages of the prior art and, in particular, to provide a photoelectric smoke detector having an improved resistance to interference and a greater smoke sensitivity even at reduced intensity of radiation and capacity.

Yet a further significant object of the present invention aims at providing a new and improved construction of a photoelectric smoke detector of the character described which is relatively simple in construction and design, extremely economical to manufacture, highly reliable in operation, not readily subject to breakdown and malfunction and requires a minimum of maintenance and servicing.

Now in order to implement these and still further object of the invention, which will become more readily apparent as the description proceeds, the photoelectric smoke detector of the present invention is manifested by the features that the evaluation circuit comprises a phase sensitive circuit regulated by the control circuit in relation to the intermittent driving of the radiation source and for inverting the alternating smoke alarm signal of the radiation receiver according to the phase of the alternating smoke alarm signal of the control circuit for generating an output signal, a display circuit as well as an integrating circuit for integrating the output signal of the phase sensitive circuit with a prescribed time-constant and for regulating the display circuit in correspondence with the integrated output signal.

In other words, the present invention is manifested by the features that the evaluation circuit comprises a phase sensitive circuit for receiving both the output signal and the alternating signal and for selectively either preserving the polarity or inverting the polarity according to the phase, means for generating a predetermined time constant and an alarm circuit. The evaluation circuit comprises an integrating circuit connected subsequent to the phase-sensitive circuit for integrating the output signal in relation to the predetermined time constant and for controlling the alarm circuit in relation to the integrated output signal.

The fire alarm device of the present invention is manifested by the features of the photoelectric smoke detector employed therein.

The invention is characterized in that the evaluation circuit comprises a phase sensitive circuit regulated by the control circuit and which inverts the alternating signal from the radiation receiver according to the phase of the alternating signal of the control circuit. The evaluation circuit also comprises an integrating circuit which integrates the output signal of the phase sensitive circuit with a prescribed time-constant and regulates a display circuit in correspondence with the integrated signal.

The invention as well as useful and advantageous further embodiments thereof will be described in reference to the exemplary embodiments represented in the figures.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
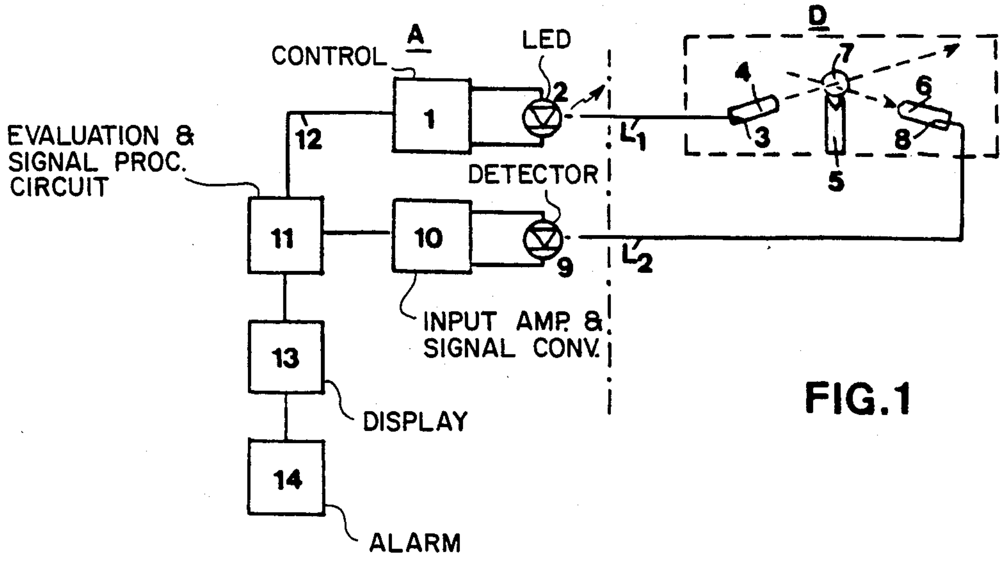
FIG. 1 shows an example of a schematic circuit diagram of a scattered radiation smoke detector.

Describing now the drawings, it is to be understood that to simplify the showing thereof only enough of the structure of the photoelectric smoke detector has been illustrated as is needed to enable one skilled in the art to readily understand the underlying principles and concepts of this invention. Turning now specifically to FIG. 1 of the drawings, the apparatus illustrated therein by way of example and not limitation will be seen to comprise a detector unit D connected to an evaluation circuit A by means of radiation conducting elements or light or optical conductors $L_1$ and $L_2$. The type of light or optical conductor is advantageously adapted to the type of radiation employed. A plurality of detector units D can also be connected in parallel to the evaluation circuit A by means of a common light or optical conductor using known gating elements or by means of a plurality of light or optical conductors. In the arrangement shown, a control or driver circuit 1 of the evaluation circuit A intermittently controls a radiation source 2 constituted by a radiation emitting diode (LED), for instance at a frequency of substantially from 0.1 to 40 kHz. The active interval is preferably of the same magnitude as the inactive interval. The radiation emitted by radiation source 2, visible light, infrared radiation or ultraviolet radiation or optical according to the type of LED, is introduced into the light conductor $L_1$ and transmitted through it to the detector unit D.

A collimating device 4 is disposed at an exit 3 of this light or optical conductor $L_1$, i.e., a special optical device which collimates the radiation coming out of the light or optical conductor $L_1$ into an at least approximately parallel beam of radiation. A further collimating device 6 is disposed outside this radiation beam and is shielded from direct radiation by a shield 5. The reception zone of the collimating device 6 is so oriented that it picks up radiation scattered by smoke particles from a scattering or measuring volume 7 and conducts it to an entrance 8 of a second light conductor $L_2$ which transmits the received scattered radiation to a solar or photodetection cell 9. This solar cell 9 converts the received radiation, i.e. the optical signal, into an electrical signal which is amplified by a input amplifier and signal converter 10. The amplifier output signal goes to a signal processing circuit 11 which also receives a reference signal from the control circuit 1 via a line 12 and which only transmits the signal to the subsequently arranged display circuit 13 when transmitted and received radiation are in coincidence. This display circuit 13 indicates, when employed as a smoke sensor, the smoke concentration corresponding to the value of the scattered radiation signal or alternatively initiates, when employed as a fire alarm, the action of an alarm device when the scattered radiation signal exceeds a prescribed threshold, thereby indicating the start of a fire.

Figure 2:
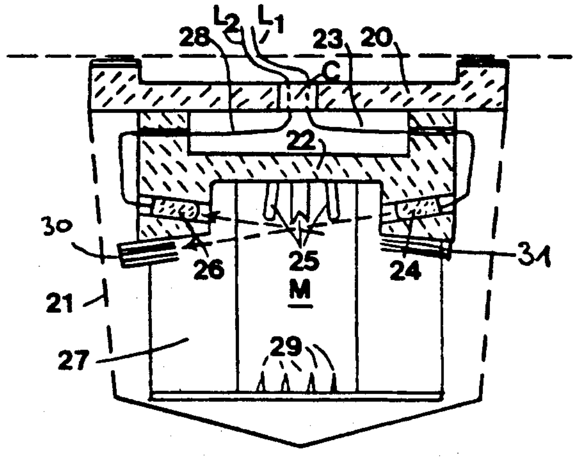
FIG. 2 shows an example of the design of a scattered radiation smoke detector.

FIG. 2 shows the construction of the detector unit D of a scattered radiation smoke detector suited for fire alarm purposes. An air-permeable housing 21 is mounted on a plastic base 20 and encloses a detection chamber or measuring volume M and a carrier element 22. Known connecting means or plug connectors C are provided in the base plate 20 for connecting the light or optical conductors $L_1$, $L_2$ to light conductor connectors 23 and 28 in the interior of the detector D whose ends cooperate with collimating devices 24 and 26. A plurality of shields 25 is mounted on the central region of the carrier element 22 for shielding residual radiation from the collimator 26. The optical arrangement in the interior housing 21 is enclosed by an air-permeable but radiation absorbing labyrinthine element 27 in order to prevent interference radiation. The labyrinthine element 27 comprises, for example, interleaved fins or radiation absorbing ribs 29 on its surfaces. A suitable radiation trap 30 can be provided for trapping direct radiation. A corresponding radiation trap 31 can be provided to terminate the reception zone.

Although the invention is particularly advantageous for detector units in which the supply of radiation and the transmission of signals is performed by means of light conductors or fiber optics usually providing only low radiation capacity, it also proves to be of particular advantage in classical smoke detectors with electrical transmission, particularly when an especially high sensitivity is required, i.e., when very low concentrations of smoke are to be detected. In the arrangement of FIG. 1 the radiation source 2 takes the place of the collimating device 4, the radiation receiver 9 takes the place of the collimating device 6 and light conductor connections $L_1$ and $L_2$ are omitted. The design of such smoke detectors can follow the teachings of U.S. Pat. No. 4,181,439.

Figure 3:
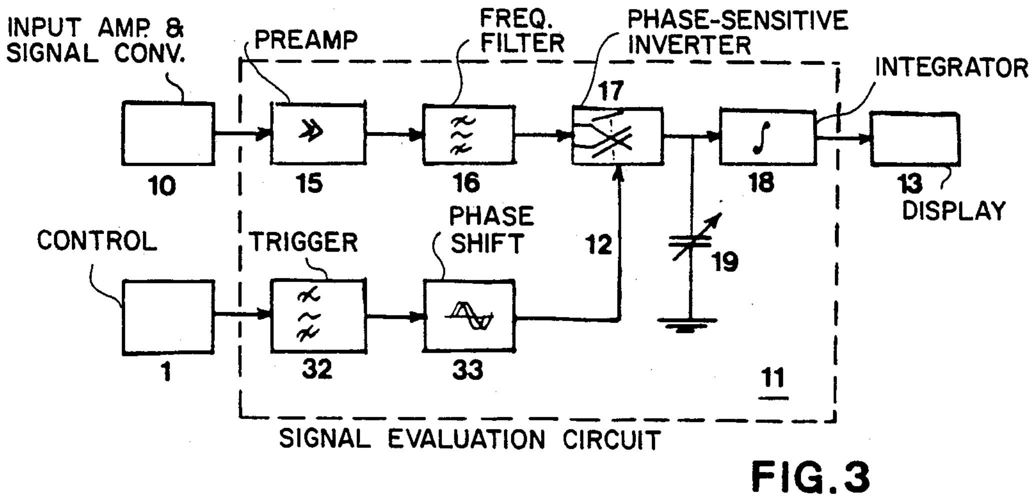
FIG. 3 shows a signal processing circuit suited for the smoke detectors according to FIGS. 1 and 2.

FIG. 3 shows an example of a signal processing circuit 11 suited for a smoke detector according to FIGS. 1 and 2. In this circuit the output signal of the input amplifier and signal converter 10 is transmitted to a low noise level preamplifier 15 and a frequency filter 16 which preferentially transmits the frequency of the control circuit 1 and damps noise. The preamplifier 15 and the frequency filter 16 can also be combined into a frequency-selective amplifier. The filtered signal passes to a phase sensitive circuit 17 which is, in turn, regulated by the control circuit 1 through a trigger circuit 32 and a phase shift circuit 33. This phase sensitive circuit 17 preserves or reverses the polarity of the signal arriving from the input amplifier or signal converter or receiver 10 according to the phase of the alternating signal of the control circuit 1. For example, during the active phases of the radiation source 2 the polarity is preserved, i.e., a received signal is retransmitted without change, and during the intermediate inactive or quiescent phases it is reversed, i.e., a positive signal is transformed into a negative signal and a negative signal into a positive. The thus modified output signal of the phase sensitive circuit 17 then goes to a subsequent integrating circuit 18 with a prescribed time-constant which can be adjustable, for instance by means of a capacitor 19. The entire signal processing circuit 11 can also be designed as a single hybrid circuit or corresponding device, eg. as a so-called lock-in amplifier.

In an evaluation circuit used in practice, the following commonly available components were used:

control circuit 1: 555 timer (Signetics) with 7473 flip-flop;
radiation source 2: 2SE3352 (Honeywell);
radiation receiver 9: PIN BPX 65 (Siemens);
input amplifier 10: ICL7621 (Intersil); and
signal processing circuit 11: 0181 (Novasina);

or signal processing device 11: 5206 lock-in (EG & G).

Figure 4:
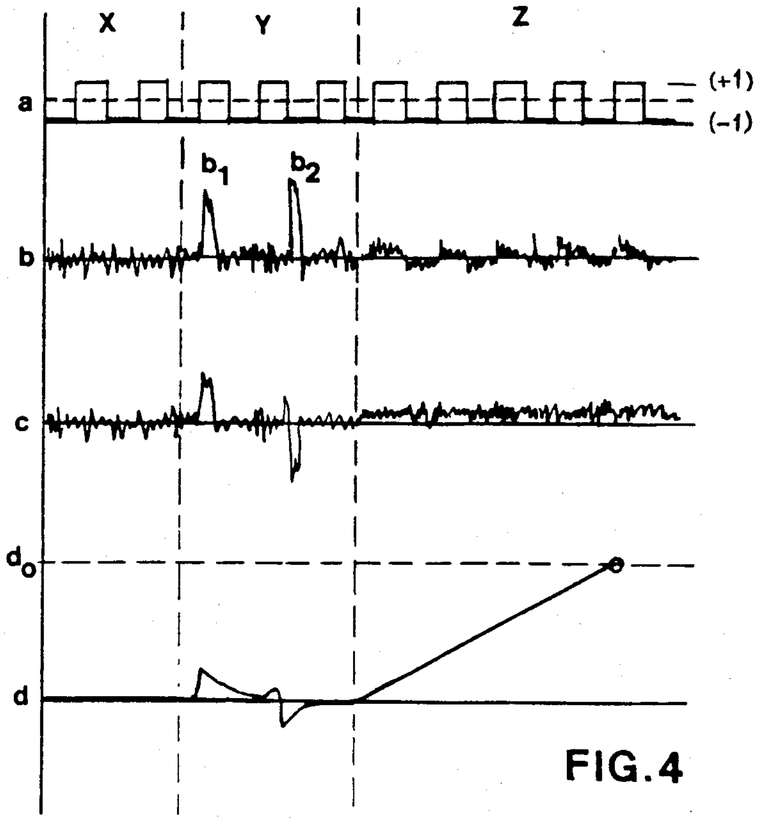
FIG. 4 shows timing diagrams of the signals present at various points of the signal processing circuit according to FIG. 3.

The function of the evaluation circuit A will be described in reference to the signal timing diagrams represented in FIG. 4 for different points of the signal processing circuit 11 according to FIG. 3. The phase sensitive circuit 17 receives at its control input the amplified control signal a from control circuit 1. Any phase transmission errors of the receiver signal can be corrected by the phase shift circuit 33. The phase sensitive circuit 17 also receives on its signal input the amplified and filtered receiver signal b. The output signal c of the phase sensitive circuit 17 appears at its output and is integrated by the integrating circuit 18 to an integrated output signal d. During time interval X no scattered radiation is received. The filtered receiver signal b is then a pure noise signal without any frequency component of the control circuit 1. The ouput signal c is the likewise a pure noise signal which when integrated produces the integrated ouput signal d=0. In a following time interval Y, two non-uniform interference signals $b_1$ and $b_2$ are superimposed on the general noise signal *b*. Since these interference signals $b_1$ and $b_2$ are not synchronous with the amplified control signal a, they are transformed into non-uniform output signals c by the periodical phase inversion, so that the integrated signal d does not substantially deviate from 0. If however, there is even the smallest periodical component in the filtered receiver signal b during a time interval Z which is identical in frequency and pahse with the control signal a, then this component, even if it is considerably weaker than the simultaneously present noise and hardly detectable therein, is transformed into the constant positive output signal c by the periodical phase reversal. The integration thus produces the constantly integrated output signal d. The rise rate is determined by the time-constant of the integrating circuit 18 and can be adjusted to the expected level of interference pulses by the appropriate choice or adjustment of the time-constants, so that a prescribed rise can be obtained by a prescribed number of sequential synchronous receiver pulses but never by irregularly occurring interference pulses. As soon as the integrated output signal d exceeds a prescribed threshold value $d_o$, i.e., reaches the alarm threshold, the display circuit 13 is activated in known manner and emits a visual, acoustical or electrical alarm.

The circuit could be simplified if the control voltage which is delivered by the evaluation control circuit 1 were a square wave. In this case the alternating signal which is delivered by the simple frequency filter constituting the trigger circuit 32 alternates between the extreme values (+1) and (−1) periodically. The phase sensitive circuit can then be a simple multiplier circuit since the alternating multiplication with (+1) and (−1) has exactly the required effect, that is the polarity reversal of the signal at the rate of the controlled signal.

The invention has been described above in reference to a scattered radiation smoke detector. The concept of the invention can also be applied in analogous manner to other types of photoelectric smoke detectors, such as radiation extinction or photo-acoustic smoke detectors, with similar advantages. The necessary adaptive measures are known to the person skilled in the art. In any case, the effect can be obtained that a display or an alarm signal is given with usual reliability only when the receiver signal is exactly synchronous, i.e. absolutely identical in frequency and phase, to the signal regulating the radiation source but by no other interference signal. The circuit operates positively and reliably even when the receiver signal is exceptionally faint and noise completely masks the detection signal so that weaker concentrations of smoke can be detected or measured than heretofore possible. The invention consciously departs from the heretofore dominating tendency obvious to the person skilled in the art of improving the signal-to-noise ratio by increasing the amplitude of the radiation pulse and reducing its width. The circuit according to the invention also operates advantageously in cases where it is useful or necessary to select a pulse width having the same order of magnitude as the pulse interval.

The smoke detector described is preferably used as a fire alarm but is also suited for other applications, for instance monitoring smoke fumes, measuring smoke intensity etc.

While there are shown and described present preferred embodiments of the invention, it is to be distinctly understood that the invention is not limited thereto, but may be otherwise variously embodied and practiced within the scope of the following claims. Accordingly,

What we claim is:

1. A photoelectric smoke detector, comprising:

a radiation source;

a control circuit for generating an alternating driving signal having a phase and serving for intermittently driving said radiation source;

a radiation receiver;

an evaluation circuit connected to said radiation receiver and capable of outputting an alternating smoke alarm signal when said radiation receiver receives radiation influenced by smoke particles in synchronization with operation of said radiation source;

said evaluation circuit comprising a phase sensitive circuit regulated by said control circuit in relation to said intermittent driving of said radiation source and for inverting said alternating smoke alarm signal of said radiation receiver according to said phase of said alternating driving signal of said control circuit for generating an output signal;

a display circuit; and an integrating circuit for integrating said output signal of said phase sensitive circuit with a prescribed time-constant and for regulating said display circuit in correspondence with said integrated output signal.

2. The photoelectric smoke detector as defined in claim 1, further including:

a frequency filter; and said alternating smoke alarm signal of said radiation receiver being transmitted through said frequency filter to said phase sensitive circuit.

3. The photoelectric smoke detector as defined in claim 1 further including:

a phase shift circuit; and said alternating driving signal of said control circuit being transmitted through said phase shift circuit to said phase sensitive circuit.

4. The photoelectric smoke detector as defined in claim 1, wherein:

said prescribed time-constant of said integrating circuit is variable.

5. The photoelectric smoke detector as defined in claim 1, wherein:

said control circuit comprises means for generating a periodical signal for operating said radiation source and for regulating said phase sensitive circuit; and said periodical signal having active intervals and inactive intervals of essentially the same order of magnitude.

6. The photoelectric smoke detector as defined in claim 1, wherein:

said control circuit comprises means for generating an at least approximately square-wave signal;

said at least approximately square-wave signal having an alternating component; and said alternating component being transmitted to said phase sensitive circuit.

7. The photoelectric smoke detector as defined in claim 6, wherein:

said phase sensitive circuit comprises a multiplier circuit.

8. The photoelectric smoke detector as defined in claim 1, wherein:

said display circuit is structured to output a signal as soon as said integrated output signal exceeds a prescribed threshold value.

9. The photoelectric smoke detector as defined in claim 1, wherein:

said radiation receiver is structured and disposed to receive scattered radiation scattered from smoke particles and to emit a signal depending on an intensity of said received scattered radiation.

10. A photoelectric smoke detector, comprising:

a source of radiation for emitting radiation;

a control circuit for generating an alternating signal exhibiting a phase and for intermittently driving said source of radiation in synchronism with said phase of said alternating signal;

a radiation receiver for receiving a portion of said radiation influenced by smoke particles and for generating an output signal indicative of said received portion and exhibiting a polarity;

an evaluation circuit connected to said radiation receiver and to said control circuit for generating a smoke alarm signal when said radiation receiver receives said portion of said radiation influenced by smoke particles in synchronism with said radiation intermittently emitted by said source of radiation;

said evaluation circuit comprising a phase-sensitive circuit for receiving both said output signal and said alternating signal and for selectively either preserving said polarity or inverting said polarity according to said phase;

means for generating a predeterminate time-constant;

an alarm circuit; and said evaluation circuit comprising an integrating circuit connected subsequent to said phase-sensitive circuit for integrating said output signal in relation to said predeterminate time-constant and for controlling said alarm circuit in relation to said integrated output signal.

11. The photoelectric smoke detector as defined in claim 10, further including:

a frequency filter connected between said radiation receiver and said phase-sensitive circuit for transmitting said output signal of said receiver.

12. The photoelectric smoke detector as defined in claim 10, further including:

a phase-shift circuit connected between said control circuit and said phase-sensitive circuit for transmitting said alternating signal.

13. The photoelectric smoke detector as defined in claim 10, wherein:

said predeterminate time-constant is a variably predeterminate time-constant.

14. The photoelectric smoke detector as defined in claim 10, wherein:

said phase of said alternating signal of said control circuit has a symmetrical phase relationship.

15. The photoelectric smoke detector as defined in claim 10, wherein:

said alternating signal is at least approximately a square-wave signal.

16. The photoelectric smoke detector as defined in claim 10, wherein:

said phase sensitive circuit comprises a multiplier circuit.

17. The photoelectric smoke detector as defined in claim 10, wherein:

said alarm circuit comprises means for generating and transmitting an alarm signal in response to said integrated output signal having exceeded a prescribed threshold value.

18. The photoelectric smoke detector as defined in claim 10, wherein:

said radiation receiver is arranged for receiving said portion of said radiation influenced by smoke particles as radiation scattered by smoke particles; and said radiation receiver comprising means for emitting said output signal in dependence of an intensity of said received scattered radiation.

19. A fire alarm device for detecting smoke particles generated by a fire, comprising:

a photoelectric smoke detector;

said photoelectric smoke detector comprising:

a source of radiation for emitting radiation;

a control circuit for generating an alternating signal exhibiting a phase and for intermittently driving said source of radiation in synchronism with said phase of said alternating signal;

a radiation receiver for receiving a portion of said radiation influenced by smoke particles and for generating an output signal indicative of said received portion and exhibiting a polarity;

an evaluation circuit connected to said radiation receiver and to said control circuit for generating a smoke alarm signal when said radiation receiver receives said portion of said radiation influenced by smoke particles in synchronism with said radiation intermittently emitted by said source of radiation;

said evaluation circuit comprising a phase-sensitive circuit for receiving both said output signal and said alternating signal and for selectively either preserving said polarity or inverting said polarity according to said phase;

means for generating a predeterminate time-constant;

an alarm circuit; and said evaluation circuit comprising an integrating circuit connected subsequent to said phase sensitive circuit for integrating said output signal in relation to said predeterminate time-constant and for controlling said alarm circuit in relation to said integrated output signal.

* * * * *

UNITED STATES PATENT AND TRADEMARK OFFICE
CERTIFICATE OF CORRECTION

PATENT NO. : 4,647,786
DATED : March 3, 1987
INVENTOR(S) : HANNES GüTTINGER et al.

It is certified that error appears in the above-identified patent and that said Letters Patent are hereby corrected as shown below:

Column 4, line 38, after "of" please insert --substantially--

Column 4, line 39, after "inactive" please insert --or quiescent--

Column 6, line 36, please delete "pahse" and insert --phase--

Signed and Sealed this

Eighteenth Day of August, 1987

*Attest:*

DONALD J. QUIGG

*Attesting Officer*

*Commissioner of Patents and Trademarks*